United States Patent
Lo

(10) Patent No.: US 10,620,230 B2
(45) Date of Patent: Apr. 14, 2020

(54) METHOD AND SYSTEM FOR ANALYZING VELOCITY DISTRIBUTION OF WATER FLOW IN A WATER BODY

(71) Applicant: National Applied Research Laboratories, Taipei (TW)

(72) Inventor: Shi-Wei Lo, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 132 days.

(21) Appl. No.: 15/869,927

(22) Filed: Jan. 12, 2018

(65) Prior Publication Data

US 2019/0056421 A1    Feb. 21, 2019

(30) Foreign Application Priority Data

Aug. 17, 2017    (TW) .............................. 106127882 A

(51) Int. Cl.
  *G01P 5/00* (2006.01)
  *G01F 1/708* (2006.01)
  *G01F 1/00* (2006.01)
  *G01P 5/06* (2006.01)

(52) U.S. Cl.
  CPC .............. *G01P 5/001* (2013.01); *G01F 1/002* (2013.01); *G01F 1/7084* (2013.01); *G01F 1/7086* (2013.01); *G01P 5/06* (2013.01)

(58) Field of Classification Search
  CPC ........ G01P 5/001; G01F 1/002; G01F 1/7084; G01F 1/7086
  USPC ....................................................... 73/1.371
  See application file for complete search history.

(56) References Cited

U.S. PATENT DOCUMENTS

2011/0217208 A1    9/2011    Narendrnath et al.
2018/0235163 A1*   8/2018    Gong .................... B08B 9/0856

FOREIGN PATENT DOCUMENTS

| CN | 103698533 A | * | 4/2014 |
| CN | 103698553 A |   | 4/2014 |
| CN | 204959864 U |   | 1/2016 |
| CN | 205812973 U |   | 12/2016 |
| TW | 201134978 A |   | 10/2011 |

OTHER PUBLICATIONS

Taiwan Intellectual Property Office, "Search Report appended to an Office Action," and English translation thereof, issued for Taiwanese patent application No. 106127882, dated Jul. 25, 2018, document of 2 pages.

* cited by examiner

*Primary Examiner* — Tarun Sinha
(74) *Attorney, Agent, or Firm* — Akerman LLP; Peter A. Chiabotti

(57) ABSTRACT

A system for analyzing velocity distribution of water flow includes a water outlet, a thermographic camera and a processing device. The water outlet is disposed above a water body for discharging sample water thereto, the sample water having a temperature higher than that of the water body. The thermographic camera is disposed above the water body for capturing first and second thermographic images of the water body at different time instances after the discharge of the sample water. The processing device calculates a flow velocity of the sample water in the water body based on the first and second thermographic images, and to analyze the velocity distribution of the water body according to the flow velocity of the sample water.

9 Claims, 7 Drawing Sheets

METHOD AND SYSTEM FOR ANALYZING VELOCITY DISTRIBUTION OF WATER FLOW IN A WATER BODY

CROSS-REFERENCE TO RELATED APPLICATION

This application claims priority of Taiwanese Patent Application No. 106127882, filed on Aug. 17, 2017.

FIELD

The disclosure relates to a method and a system for analyzing a velocity distribution of water flow in a water body.

BACKGROUND

Conventionally, measurement of a flow velocity of water flow in a water body (e.g., a river) may be done in a number of ways. For example, a current meter, such as a Price type current meter, a propeller-type current meter or the like may be employed to detect a velocity of a fluid (e.g., water) in the water body. The current meter may be disposed in the water body for measuring the flow velocity at one or more depths (e.g., 20%, 60% or 80% of a depth of the water body). However, the current meter may not function properly when the flow velocity of the water is higher than, for example, 4 meters per second.

Another way to perform the measurement is to dispose a floating object (e.g., a buoy or an object made by expanded polystyrene) on a surface of the water body, and to calculate the flow velocity of the water on the surface based on a displacement of the floating object within a time period. This method may be employed when it is determined that the flow velocity of the water is higher than 4 meters per second. However, retrieval of the floating object is difficult, and leaving the floating object in the water body may cause pollution of the environment.

A further way is to perform the measurement without contacting the water and involves use of a surface velocity radar (SVR) that may be handheld or placed stationarily. It is noted that, once the velocity of the fluid is known, a volumetric flow rate (also known as discharge) may be calculated by multiplying the velocity of the fluid by an area of a cross-section of a part of the water body where the measurement is performed, and an early warning of flood may be outputted according to the volumetric flow rate. However, the SVRs are generally handheld and operated by human inspectors instead of planted at each of the rivers mainly due to cost. As a result, continuous measurement and monitoring of each of the rivers becomes difficult because of limited man power and also potential safety concerns stemming from hazardous weather conditions (e.g., flooding caused by a typhoon).

SUMMARY

One object of the disclosure is to provide a system that is configured for analyzing a velocity distribution of water flow in a water body.

According to one embodiment of the disclosure, the system includes a water outlet, a thermographic camera and a processing device.

The water outlet is configured to be disposed above the water body for discharging sample water into the water body, the sample water having a temperature higher than that of the water body.

The thermographic camera is configured to be disposed above the water body for capturing at least a first thermographic image of the water body upon discharge of the sample water into the water body and a second thermographic image of the water body after capturing the first thermographic image.

The processing device is electrically connected to the thermographic camera for receiving the first and second thermographic images, and is programmed to calculate a flow velocity of the sample water in the water body based on the first and second thermographic images and to analyze the velocity distribution of the water body according to the flow velocity of the sample water.

Another object of the disclosure is to provide a method implemented by the above-mentioned system for analyzing the velocity distribution of water flow in the water body.

According to one embodiment of the disclosure, the method includes steps of:

discharging, via a water outlet disposed above the water body, sample water into the water body, the sample water having a temperature higher than that of the water body;

capturing, by a thermographic camera disposed above the water body, a first thermographic image of the water body upon the step of discharging sample water into the water body;

capturing, by the thermographic camera, at least a second thermographic image of the water body after the step of capturing a first thermographic image of the water body;

calculating, by a processing device, at least one flow velocity of the sample water in the water body based on the first and second thermographic images; and analyzing, by the processing device, a velocity distribution of the water body according to the at least one flow velocity of the sample water.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
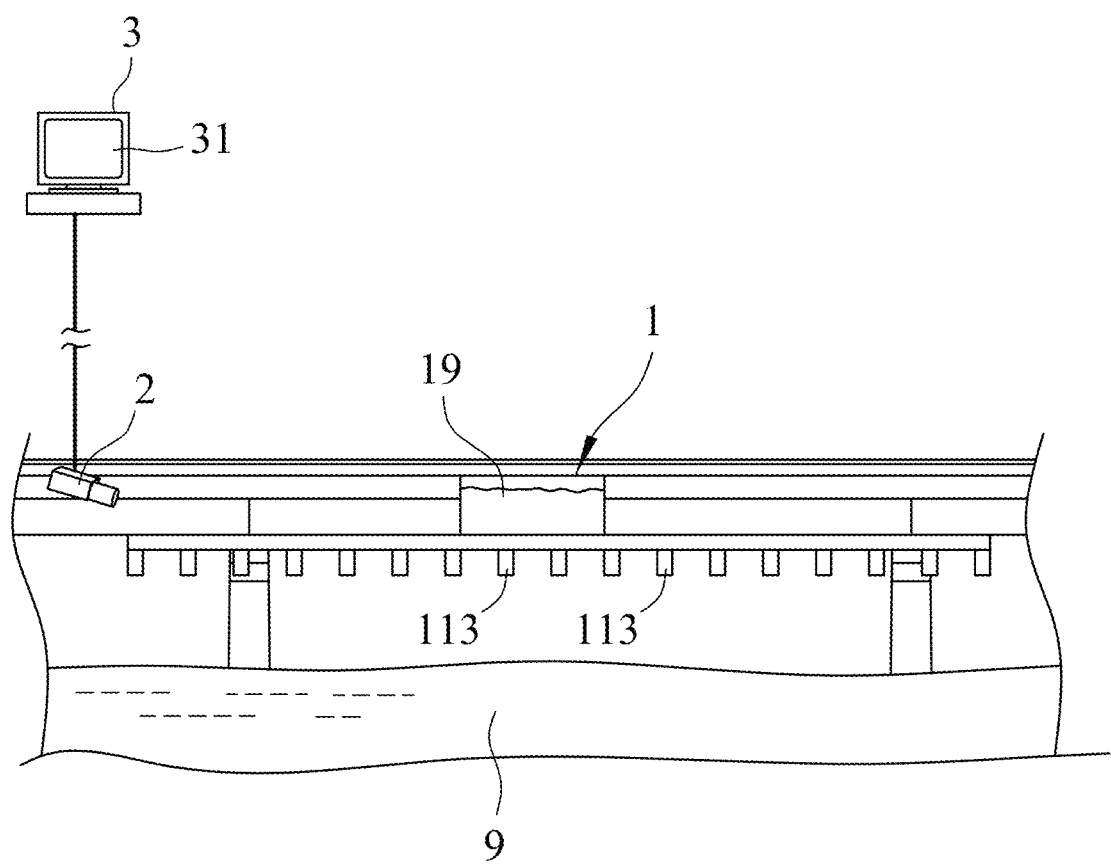
FIG. 1 is a schematic diagram illustrating a system for analyzing a velocity distribution of water flow in a water body according to one embodiment of the disclosure.

FIG. 1 illustrates a system for analyzing a velocity distribution of water flow in a water body 9, according to one embodiment of the disclosure. In this embodiment, the system is placed near a river, which serves as the water body 9. The system includes a water discharge subsystem 1, a thermographic camera 2 and a processing device 3.

Figure 2:
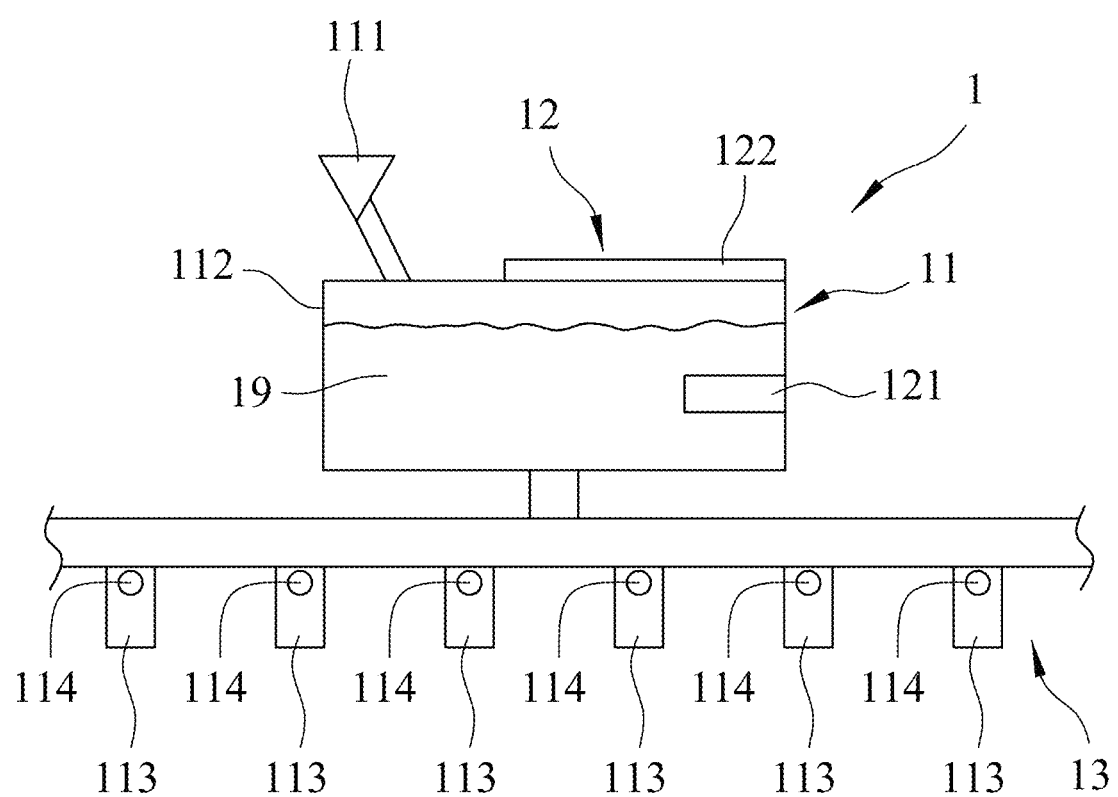
FIG. 2 is a schematic diagram illustrating a water discharge subsystem of the system according to one embodiment of the disclosure.

FIG. 2 illustrates the water discharge subsystem 1 according to one embodiment of the disclosure. In this embodiment, the water discharge subsystem 1 includes a water containing unit 11, a heating component 12 and a water outlet unit 13.

The water containing unit 11 includes a water container 112 that has an opening 111 for receiving water. In this embodiment, the water container 112 may be in the form of a vacuum flask that has heat-insulating effects, and the opening 111 receives and collects rainwater to be stored in the water container 112.

The heating component 12 is for heating the rainwater contained in the water container 112, so as to prepare sample water 19. The term "sample water" indicates rainwater contained in the water container 112 heated to have a temperature higher than that of the water body 9.

The heating component 12 may include at least one of an electrical heater 121 and a transmissive optical device 122 (e.g., a converging lens) disposed at the water container 112. The transmissive optical device 122 is for converging sunlight onto the rainwater contained in the water container 112 for heating the rainwater. It is rioted that, when heating by the transmissive optical device 122 is not possible due to, for example, weather conditions, the electrical heater 121 may be activated to heat the rainwater. In some embodiments, the electrical heater 121 is activated at all times, regardless of whether heating by the transmissive optical device 122 is feasible or not.

The water outlet unit 13 includes a plurality of water outlets 113, and a plurality of valves 114 connected to the water outlets 113, respectively. The water outlets 113 are connected to the water container 112, and are disposed above the water body 9. Each of the valves 114 controls discharge of the sample water 19 contained in the water container 112 into the water body 9 through the respective water outlet 113. In this embodiment, the water outlet unit 13 is disposed to span the receiver (i.e., the water body 9), i.e., crossing from a left riverbank to a right riverbank.

The thermographic camera 2 is configured to be disposed body above the water 9 for capturing thermographic images of the water body 9. In this embodiment, the thermographic camera 2 may be embodied using an infrared camera with sensitivity to a difference in temperature of at least 0.08 to 0.1 degrees Celsius.

The processing device 3 may be embodied using a computing device (e.g., a personal computer, a tablet computer, a portable electronic device, etc.) that includes a display 31, and a processor (not depicted in the drawings) for performing computations. The processing device 3 is coupled to the water discharge subsystem 1 for controlling the operations thereof, and is coupled to the thermographic camera 2 for receiving the thermographic images therefrom. The communication between the processing device 3 and the water discharge subsystem 1 may be established using a wireless connection. The communication between the processing device 3 and the thermographic camera 2 may be established using a wireless communication or a wired connection.

Figure 3:
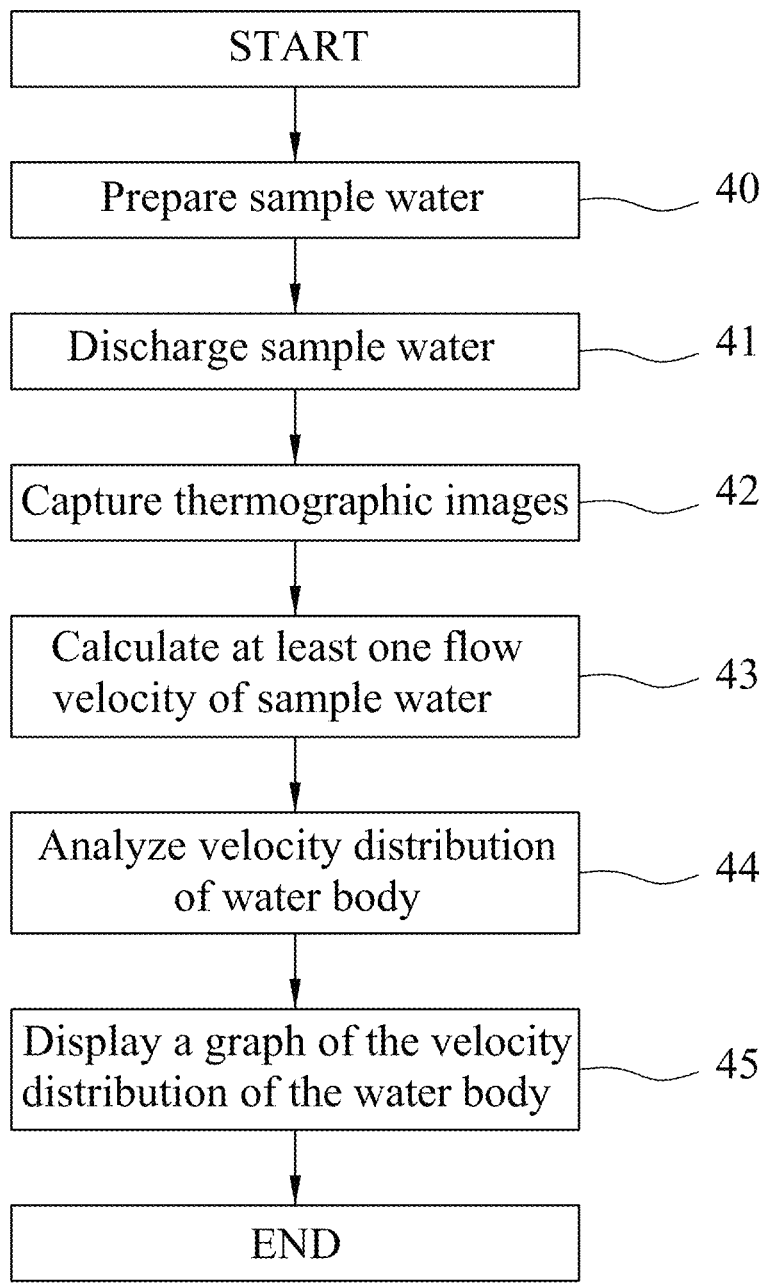
FIG. 3 is a flow chart illustrating steps of method for analyzing a velocity distribution of water flow in the water body, according to one embodiment of the disclosure.

FIG. 3 is a flow chart illustrating steps of a method for analyzing a velocity distribution of water flow in the water body, according to one embodiment of the disclosure.

Figure 4:
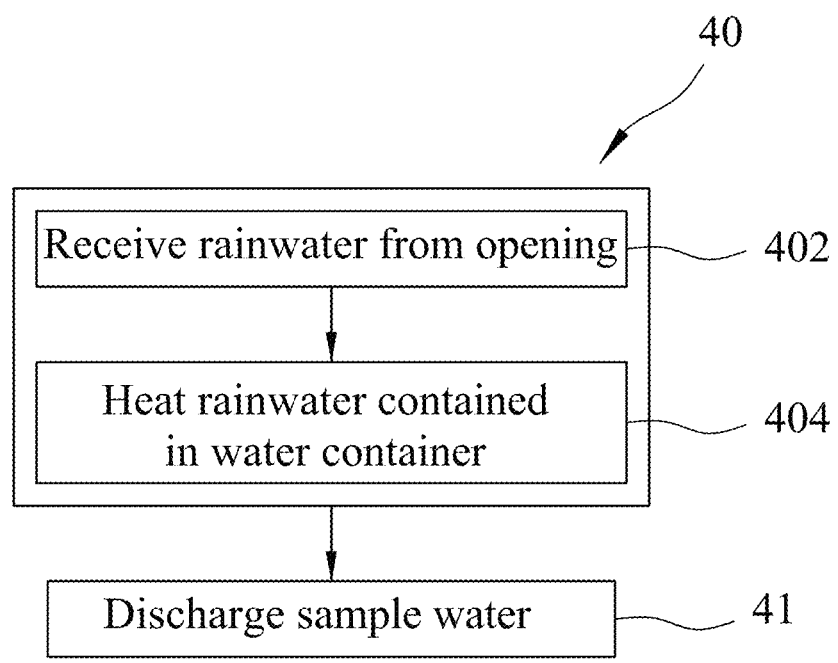
FIG. 4 is a flow chart illustrating sub-steps for preparing sample water.

In step 40, the sample water 19 is prepared. In particular, as shown in FIG. 4, step 40 includes sub-step 102, in which rainwater flowing through the opening 111 is received by the water container 112, and sub-step 404, in which the heating component 12 heats the rainwater contained in the water container 112 to serve as the sample water 19. In this embodiment, since the thermographic camera 2 used may be able to distinguish a temperature difference as small as 0.08 to 0.1 degrees Celsius, the temperature of the sample water 19 is made higher than that of the water body 9 by at least one degree Celsius, and depending on various uses, the sample water 19 may be heated to an even higher temperature. The temperature of the water body 9 at a given time instant may be obtained from a thermographic image of the water body 9 captured by the thermographic camera 2 at the given time instant, and the heating component 12 heats the sample water 19 with reference to the temperature of the water body 9.

In step 41, the valves 114 are controlled to open the respective water outlets 113, thereby discharging the sample water 19 into the water body 9.

In step 42, the thermographic camera 2 is controlled to capture at least a first thermographic image of the water body 9 upon discharge of the sample water 19 into the water body 9, and a second thermographic image of the water body after capturing the first thermographic image.

Figure 5A:
FIGS. 5A and 5B are exemplary thermographic images of a water body that are captured one minute apart from each other.
Figure 5B:
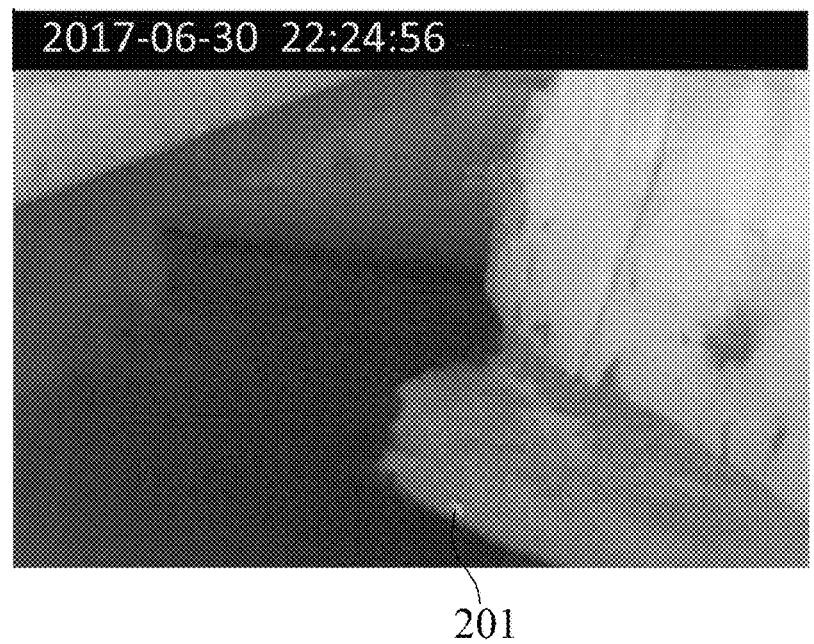

In some embodiments, the second thermographic image is captured after a pre-determined time duration (e.g., one minute) has elapsed upon discharge of the sample water 19. FIGS. 5A and 5B are exemplary thermographic images of a water body that are captured one minute apart from each other, during which a heat object 201 moved slightly forwards.

In some embodiments, the thermographic camera 2 may be configured to capture thermographic images continuously during a pre-determined time period upon the discharge of the sample water 19.

Figure 6:
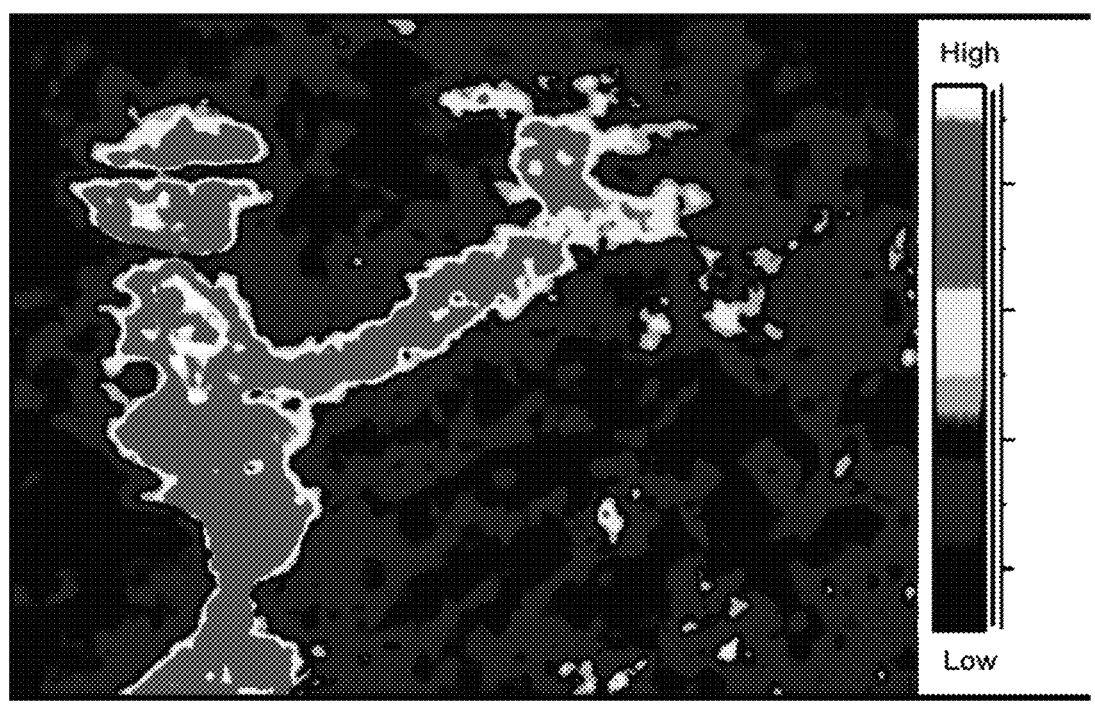
FIG. 6 is an exemplary second thermographic image taken after a pre-determined time duration has elapsed following discharge of the sample water.

FIG. 6 illustrates an exemplary second thermographic image, taken after the pre-determined time duration has elapsed after the discharge of the sample water 19.

In step 43, upon receipt of the first and second thermographic images from the thermographic camera 2, the processing device 3 calculates at least one flow velocity of the sample water 19 in the water body 9 based on the first and second thermographic images. In particular, the processing device 3 first identifies in the first thermographic image a plurality of thermal particles in the sample water 19 that are significantly hotter than the water body 9. Then, the processing device 3 calculates a displacement of each thermal particle according to a difference between a position of the thermal particle in the first thermographic image and a position of that in the second thermographic image, and calculates the flow velocity of each of the thermal particles based on the displacement and the pre-determined time duration. For example, a thermal particle (e.g., the heat object 201) may be identified in the first thermographic image of FIG. 5A. It is noted that the sample water 19 may be flowing in the water body 9 in various directions, and by analyzing the first and second thermographic images, multiple flow velocities corresponding to different flow directions of the sample water 19 may be calculated.

In step 44, the processing device 3 analyzes a velocity distribution of the water body 9, according to the at least one flow velocity of the sample water 19 calculated in step 43. In particular, the velocity distribution of the water body 9 is obtained based on the flow velocity of each of the thermal particles and the flow directions of the sample water 19.

In step 45, the processing device 3 is configured to display a graph of the velocity distribution of the water body 9 on the display 31.

Figure 7:
FIG. 7 is an exemplary graph of the velocity distribution according to one embodiment of the disclosure.

FIG. 7 illustrates an exemplary graph 70 of the velocity distribution according to one embodiment of the disclosure.

In this embodiment, the graph 70 is originally a thermographic image taken at a beach 29 near a water body 20 (which is a sea). The processing device 3 may generate the graph 70 by superimposing multiple arrows on parts of the thermographic image showing the water body 20, so as to indicate flow velocities calculated in different parts of the water body 20, thereby composing the velocity distribution (also known as a flow field distribution) on the surface of the water body 20.

It is noted that in other embodiments, the graph of the velocity distribution may be represented in other forms, such as a computer-generated graph.

In some embodiments, the processing device 3 is in communication with a network (e.g., the Internet so as to transmit the graph of the velocity distribution and/or other information to other parties for notification.

To sum up, embodiments as described above provide a way to analyze a velocity distribution of water flow in a water body 9. It is noted that since only the sample water 19, which is ordinary water that is heated, is discharged into the water body 9, the method does not introduce potential pollution for the purpose of calculating the flow velocity. Additionally, implementation of the system is relatively cost efficient since no expensive equipment such as surface velocity radar is required, and continuous monitoring of multiple water bodies may be achieved, providing more timely results, which is beneficial in that notification can be provided to the relevant parties when abnormality occurs.

Moreover, after the system is installed, no human inspector is required to be present by the water body to perform the measurement. In addition to the reduction of the human resource requirements, this configuration may be especially useful when the measurement is to be performed in harsh weather conditions (e.g., flooding), since potential safety risks to a human inspector may be eliminated.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for analyzing a velocity distribution of water flow in a water body, said system comprising:
    a water outlet configured to be disposed above the water body for discharging sample water into the water body, the sample water having a temperature higher than that of the water body;
    a thermographic camera configured to be disposed above the water body for capturing at least a first thermographic image of the water body upon discharge of the sample water into the water body and a second thermographic image of the water body after capturing the first thermographic image; and
    a processing device electrically connected to said thermographic camera for receiving the first and second thermographic images, and programmed to calculate a flow velocity of the sample water in the water body based on the first and second thermographic images and to analyze the velocity distribution of the water body according to the flow velocity of the sample water;
    a water container connected to said water outlet, said water container having an opening for collecting rainwater;
    a heating component disposed at said water container for heating the rainwater contained in said water container to serve as the sample water; and
    a valve connected to said water outlet for controlling the discharge of the sample water contained in said water container into the water body through said water outlet.

2. The system of claim 1, wherein said heating component includes an electrical heater.

3. The system of claim 1, wherein said heating component includes a transmissive optical device configured to use sunlight for heating the rainwater.

4. The system of claim 1, wherein said thermographic camera is an infrared camera.

5. The system of claim 1, wherein said processing device is further programmed to display a graph of the velocity distribution of the water body.

6. A method for analyzing velocity distribution of water flow in a water body, comprising steps of:
    discharging, via a water outlet disposed above the water body, sample water into the water body, the sample water having a temperature higher than that of the water body;
    capturing, by a thermographic camera disposed above the water body, a first thermographic image of the water body upon the step of discharging sample water into the water body;
    capturing, by the thermographic camera, at least a second thermographic image of the water body after the step of capturing a first thermographic image of the water body;
    calculating, by a processing device, at least one flow velocity of the sample water in the water body based on the first and second thermographic images; and
    analyzing, by the processing device, a velocity distribution of the water body according to the at least one flow velocity of the sample water;
    the method further comprising, prior to the step of discharging sample water into the water body, steps of:
        receiving water by a water container connected to the water outlet; and
        heating the water in the water container to serve as the sample water.

7. The method of claim 6, wherein the step of receiving water includes collecting and storing rainwater.

8. The method of claim 6, wherein the thermographic camera is an infrared camera.

9. The method of claim 6, further comprising displaying, by the processing device, a graph of the velocity distribution of the water body.

* * * * *